Patented Oct. 28, 1952

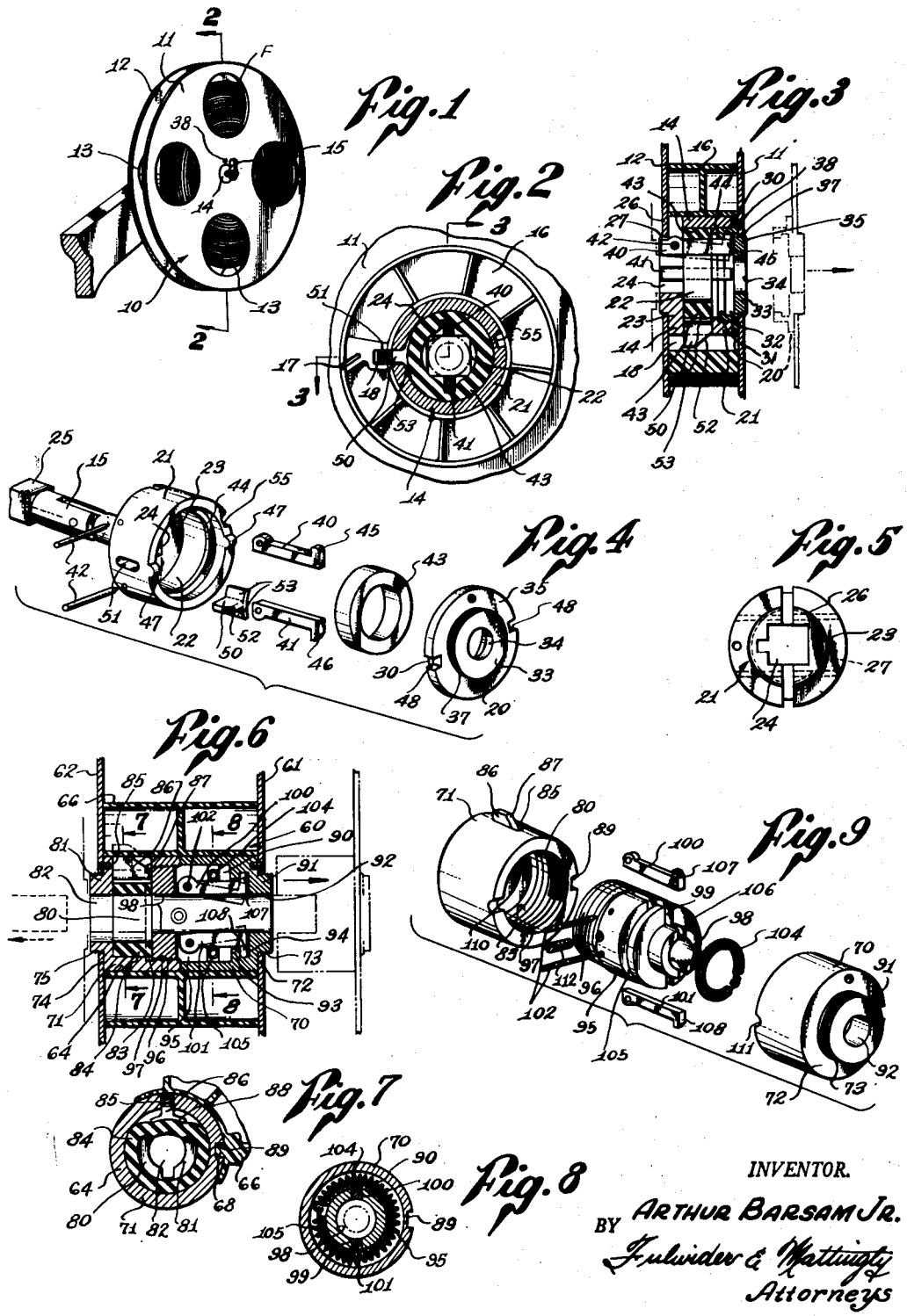

2,615,643

UNITED STATES PATENT OFFICE 2,615,643

REEL AND ADAPTER THEREFOR

Arthur Barsam, Jr., Los Angeles, Calif.

Application April 23, 1951, Serial No. 222,456

8 Claims. (Cl. 242—70)

My invention relates generally to photographic and other recording equipment, and more particularly to a separable reel and adapter which interlock with a standard supply spool to greatly facilitate processing and transportation of film.

A preferred embodiment of my invention is particularly advantageous in connection with motion picture or cinema film and will be described with references thereto. However, the invention is not so limited, and may also be used with spooled recording tape and the like, as will be obvious to those skilled in the art.

In my Patent No. 2,430,598, issued November 11, 1947, for "Spindle," I have disclosed a spindle which is adapted to fit interchangeably with either of the two types of film spools commonly used. Some spools have an inwardly projecting key for loading in the film magazine of a camera, while others have a recessed keyway to fit different kinds of cameras. By the use of my prior invention, any camera mechanism may be converted for loading with either type of film spool to avoid the necessity and inconvenience of obtaining a particular type. My present invention is partly concerned with an extension of the same problem in conjunction with processed film, and to a greater extent relates to the problem of film handling in general.

After the film has been developed and processed, it is sent to a film exchange and wound on suitable reels. Thereafter the film and reel are always shipped together, and the dead weight of the reel increases the load to a considerable extent. Furthermore, the reel requires a different container from that originally supplied with the film because of its necessarily larged dimension. To avoid this increased load, the film is sometimes wound from the reel onto a standard spool and then rewound onto reels at the destination. As can be understood, this is a time-consuming and inconvenient operation at best. By providing my improved two-part reel, the film is always wound on either type of standard spool and is transported on this spool alone. Upon reaching its destination, the spool is quickly interlocked on my improved reel without rewinding of the film and is then ready for use on projection equipment or the like. A further economy is also possible since the need for spare reels on which to wind and rewind the film is eliminated.

Accordingly, it is a major object of my invention to provide a separable reel which is adapted to interlock with a standard film spool to avoid rewinding operations.

Another object of my invention is to provide a separable reel having a single adapter which fits interchangeably with either of the types of standard film spools.

It is also an object of my invention to provide a separable reel which is positively locked together by quick-connect means to facilitate its use.

A further object of my invention is to provide a preferred and modified form of adapter mechanism for use on either 16 mm. or 35 mm. reels.

Still another object of my invention is to provide a separable reel which is simple and inexpensive to manufacture and is effective in operation.

These and other objects and advantages of my invention will become apparent from the following description of a preferred and modified form thereof, and from an inspection of the accompanying drawings, in which:

Fig. 1 is a perspective view of a preferred form of assembled reel;

Fig. 2 is a partial section taken in the direction 2—2 of Fig. 1;

Fig. 3 is a right-angular section taken along the line 3—3 of Fig. 2;

Fig. 4 is an exploded view of the adapter mechanism;

Fig. 5 is a partial rear elevation of the adapter body;

Fig. 6 is a section taken through a modified form of adapter mechanism;

Fig. 7 is a section taken along the line 7—7 of Fig. 6;

Fig. 8 is a section taken along the line 8—8 of Fig. 6; and

Fig. 9 is an exploded view of the modified adapter mechanism.

Referring now to the drawings, and particularly to Fig. 1 thereof, the numeral 10 designates a preferred form of my reel. A pair of circular sides formed as front and rear plates 11 and 12, respectively, are mounted on a central spindle adapter 14 so as to guide and confine the edges of a roll of film or tape F wound therebetween. The reel sides 11 and 12 are each provided with large peripherally spaced openings 13 in the conventional manner, to facilitate observation of the film F. A spindle shaft 15 extends forwardly from a unit of conventional projection equipment and passes through the spindle adapter 14 to rotatably support the reel 10 for winding or unwinding of the film F.

As is best seen in Figs. 2 and 3, the adapter 14 is a generally tubular member extending between the sides 11 and 12. A standard 16 mm. film spool 16 is removably fitted on the adapter 14 to lie between the reel sides 11 and 12. The spool 16 is formed typically as a light drum supported by a spider from a centrally disposed tubular hub which surrounds the adapter 14. The external surface of the drum 16 is provided with an angular slot 17 to engage with the inner end of the film strip F which is then wound in a roll around the outer drum-like surface. The hub of the spool 16 is of standardized internal diameter to fit closely on the adapter 14, and in this case is provided with a keyway 18 to lock with key means projecting from the adapter. As will later be described, the spool 16 may in some cases have an inwardly projecting key in place of the keyway 18, and, of course, may be of a size for a different film width.

In order that the spool 16 may be mounted and removed from the adapter 14, it is necessary that the reel sides 11 and 12 separate so that the spool may slide over one end of the adapter. The adapter 14 is formed as two separable body members 20 and 21 which are held in coaxial alignment and are normally joined by quick-connect means. The front reel side 11 is rigidly mounted on the member 20 and the rear side 12 is mounted on the member 21 so that they extend normal to the rotational axis of the reel. The front body member 20 is formed as a short tubular body, while the rear member 21 is elongated to properly space apart the sides 11 and 12. Thus, it is evident that with the members 20 and 21 separated, the spool 16 may slide freely over the rear member 21, and will be interlocked between the reel sides 11 and 12 as the member 20 is connected in place.

The rear adapter body 21 is a tubular member bored to provide a forwardly opening chamber 22 which abuts a rear wall 23 provided with a smaller aperture or socket 24, as is best seen in Fig. 5. The socket 24 is formed to receive the spindle shaft 15 and is typically square as many of such shafts are provided with a partially raised square driving shank 25, as seen in Fig. 4. An external shoulder 26 is cut into the rear face of the body member 21 to abut the reel side 12 which is locked firmly onto the reduced end of the body by suitable fastening means, such as threads 27.

The front adapter body 20 is a short disk-like member having a reduced hub or flange 30 which extends rearwardly and is formed to fit slidably within the chamber 22. The flange 30 has an internal lip 31 which defines an annular locking groove 32 abutting a forward wall 33. The wall 33 is bored at 34 to receive the leading end of the spindle shaft 15 which projects therethrough. An external shoulder 35 is cut into the forward face of the body 20 to brace the reel side 11 which is locked firmly onto the reduced end of the body by fastening means such as the threads 37. A lock screw 38 may also be engaged in the reel side 11 and body 20 to resist unthreading of these members.

In order to connect the members 20 and 21, a pair of pivoted latch members 40 and 41 are mounted within the chamber 22 and are movable outwardly to engage in the locking groove 32. The latch members 40 and 41 are spaced apart in opposed relationship and extend longitudinally through the body 21. Each latch 40 and 41 is pivotally mounted in the rear body wall 23 by means, such as removable pivot pins 42, as may best be seen in Fig. 4. Surrounding the latch members 40 and 41 within the chamber 22 is a resilient member 43 formed as an annulus of rubber or synthetic rubber, and of substantial thickness so that the latch members are pressed inwardly with considerable force. A keeper ring 44 is formed integral with the body 21 and serves to hold the annulus 43 in proper axial position. The action of the annulus 43 is such as to pivot the latch members 40 and 41 inwardly towards the axis of the body 21, as is indicated by the phantom outline of Fig. 3.

On the forward ends of the latch members 40 and 41 are outturned arms 45 and 46, respectively, which are of such width as to fit closely within the locking groove 32. When the latches 40 and 41 are pivoted inwardly, the arms 45 and 46 are sufficiently close together so as to pass within the lip 31 of the forward body member 20. This is the connecting position of the members 20 and 21, and the flange 30 slides freely within the chamber 22. The complete reel 10 is then seated on the spindle shaft 15. As the shaft 15 enters the chamber 22, the latch members 40 and 41 are wedged apart by the surface of the shaft. The arms 45 and 46 enter the locking groove 32 and the reel sides 11 and 12 are held firmly against separation. As can be understood, the removal of the reel 10 from the shaft 15 allows the reel sides 11 and 12 to be separated without any further operations. Thus, the quick-connect means which I provide are both simple and foolproof in operation.

For the purpose of preventing relative rotation between the reel sides 11 and 12, opposed detents 47 may be provided on the forward edge of the body member 21, as is best seen in Fig. 4. The detents 47 are adapted to register with notches 48 cut in the body member 20 so as to hold the body members against rotation after assembly. In this manner the reel sides 11 and 12 are positively locked against relative rotation.

It will be remembered that the spool 16 was provided with an internal keyway 18 to interlock with projecting means formed on the adapter 14 and hold the spool against rotation thereon. A resiliently urged key 50 similar to those disclosed in my aforementioned patent projects from the adapter body 21 to engage with the keyway 18. A longitudinal slot 51 is cut in the side of the body 21 outside of the chamber 22, as is best seen in Fig. 4. The key 50 is mounted within the slot 51 for sliding movement in a radial direction and has an outer forwardly tapered edge 52. On the inner end of the key 50 are lateral projections 53 which limit the outward movement of the key by engaging against the wall of the chamber 22, and also serve as footings to support the key on the resilient member 43. The key 50 is normally held outwardly by the resilience of the member 43 in a position to engage with the keyway 18 and lock the spool 16 against rotation on the adapter 14.

As was previously mentioned, the spools 16 are of two standard types, having either the keyway 18 or a complemental key which projects inwardly. For the purpose of receiving such a key, I provide the outer surface of the adapter 14 with a longitudinal keyway 55 spaced suitably from the key slot 51. When the second type of spool is supplied, the keyway 55 serves to interlock with the spool key to hold the spool against rotation on the adapter 14. The resiliently urged key 50 is pressed inwardly by the camming action of the spool hub on the tapered surface 52, and the key moves into a position flush with the surface of the body 21 so as not to interfere with the seating of the spool. It is therefore evident that the adapter 14 is able to receive either of the standard types of spools with equal facility.

In Figs. 6 to 9, I have illustrated a modified form of reel 60 which is generally similar to the preferred form. The reel 60 includes a pair of reel sides 61 and 62 mounted on a central spindle adapter 64 which is somewhat different from the previously described adapter. Principally, the adapter 64 differs in the provision of separate resilient means for actuation of the adapter key and latch means. A standard 35 mm. film spool 66 is described in conjunction with the adapter 64, but as can be understood, either form of adapter may be designed for a particular film spool, and the choice indicated is merely illustrative. The spool 66 is formed typically as a light drum having a hub of standardized internal diameter to fit closely on the adapter 64, and in this case, is provided with an inwardly projecting key 68 which interlocks with the adapter, as is best seen in Fig. 7.

In order to separate the reel sides 61 and 62 so that the spool 66 may be positioned, the adapter 64 is made in two parts, front and back members 70 and 71, respectively. Both the front and rear members 70—71 are formed as elongated tubular bodies which meet centrally within the spool 66 and are connected by latch means similar to that used in the preferred form. The body member 70 has a forward external shoulder 72 and threaded stud 73 to seat the reel side 61, and the rear body member 71 has a similar shoulder 74 and stud 75 for engagement with the reel side 62. The sides 61 and 62 are thus held rigidly perpendicular to the rotational axis of the adapter 64.

The key means for engagement with the film spool have a construction which is generally similar to that used in the preferred form. The body member 71 is bored to form a chamber 80 which extends rearwardly to a vertical wall 81. In the center of the wall 81 is a reduced aperture 82 which is formed to fit slidably with a spindle shaft, such as is shown in the phantom outline of Fig. 6. The chamber 80 is divided centrally by a shallow keeper ring 83 which projects a small distance inwardly from the peripheral wall of the chamber. A resilient annular member 84 is mounted in the rear portion of the chamber 80 and is held against axial movement by the keeper ring 83.

A longitudinal slot 85 is cut in the side of the body 71 outside of the chamber 80, as is best seen in Fig. 9. A key 86 is mounted in the slot 85 for radial sliding movement, and has an outer forwardly tapered edge 87. On the inner end of the key 86 are lateral projections 88 which limit the outward movement of the key by engaging against the wall of the chamber 80, and also serve as footings to support the key and resilient member 84. The key 86 is normally urged outwardly by the resilient member 84, but may be pressed inwardly to lie flush with the surface of the body 71, as is seen in Fig. 7.

To accommodate the type of spool 66 having the internal key 68, the body members 70 and 71 are provided with a longitudinal keyway 89 on the external surface thereof. The key 68 slides freely into the keyway 89 to hold the spool 66 against rotation on the adapter 64. Meanwhile, the key surface 87 is cammed inwardly by the spool hub so that the key 86 is moved to the flush position and does not interfere with the seating of the spool. In the event that a standard spool having a keyway is supplied, such as is illustrated in conjunction with the preferred form of the device, the resiliently urged key 86 enters the keyway to lock the spool against rotation. It is thus evident, that the modified form of adapter will interlock interchangeably with either type of film spool in a manner similar to that of the preferred form.

The front body member 70 has a rearwardly opening chamber 90 which extends to a front wall 91. An opening 92 of reduced size is formed in the wall 91 to journal the previously mentioned spindle shaft which is extended through the reel. In the front portion of the chamber 90 is an inwardly projecting lip or ring 93 which defines an annular locking groove 94 adjacent the wall 91. The rear end of the body 70 seats flush with the adjacent end of the body 71 so that the chambers 80 and 90 are in open communication.

As was previously mentioned, the major difference between the adapter 64 and the preferred adapter 14 is the provision of separate resilient means for actuation of the latching means. In order to connect the members 70 and 71, a hub or sleeve 95 projects forwardly from the member 71 to fit slidably within the chamber 90. The rear portion of the sleeve 95 is externally threaded at 96 to engage firmly with threads 97 formed in the forward end of the chamber 80. Thus, the sleeve 95 is firmly seated within the member 71. Extending through the sleeve 95 is an axial bore 98 which is formed to fit closely around the spindle shaft of the projection equipment. A diametrically cut slot 99 extends through the forward portion of the sleeve 95 and intersects with the axial bore 98, as may be seen in Fig. 9. Pivotally mounted in the slot 99 are a pair of opposed latch members 100 and 101 positioned for sliding movement in the radial direction. The rear ends of the latch members 100 and 101 are supported by suitable pivot pins 102 which extend laterally through the sleeve 95.

The latch members 100 and 101 are urged to pivot inwardly by a resilient member 104 seated within a deep annular groove 105 cut externally into the sleeve 95. The resilient member 104 is preferably formed as a coil spring wound into an annular ring and connected as an endless band. The latch members 100 and 101 are normally urged inwardly by the resilient member 104 so that the forward ends thereof lie within the axial bore 98. The forward end of the sleeve 95 is reduced externally to form a head 106 which will slide within the front chamber lip 93, and allow the forward ends of the latch members 100 and 101 to register with the locking groove 94. Outwardly projecting arms 107 and 108 are formed on the tips of the latch members 100 and 101, respectively, to move outwardly and lock within the groove 94.

As a spindle shaft is passed through the axial bore 98, the latch members 100 and 101 are wedged outwardly to force the latch arms 107 and 108 into locking engagement with the groove 94. Thus the members 70 and 71 are firmly connected together, and may be quickly separated by removal of the spindle shaft. In order to prevent relative rotation between the members 70 and 71, cooperating edge notches 110 and 111 are cut in these members adjacent a stud 112 which is threadedly engaged with the sleeve 95. The stud 112 locks the sleeve within the member 71, and in turn engages with the notch 111 to lock the member 70 as the latter is brought into connecting position.

The operation of either form of my preferred reel is extremely simple. The film wound on a standard spool is transported in its original container to the location of the projection equipment. The reel sides are separated, and the film spool is slipped over the spindle adapter mounted on one of the reel sides. The opposite reel side is then moved into connecting position, confining the film in place. The complete reel is then mounted on the spindle shaft of the desired projection equipment, and the reel sides are locked together with the quick-connect means, as has been described. Thus it is evident that numerous rewinding operations can be avoided by the use of my device, and a substantial economy may be effected.

Although I have shown preferred and modified forms of my invention which are fully capable of carrying out the aforementioned objects and advantages, it is apparent that many modifications of design and construction will be apparent to those skilled in the art without departing from the scope of my invention. Therefore, I do not wish to be limited to the details of construction herein described, except as defined in the appended claims.

I claim:

1. A reel of the class described which includes: a first reel side; a second reel side; spindle means connected to said reel sides and holding said reel sides in spaced parallel relationship, said spindle means being formed to seat a spool having an internal key extending therefrom and also to seat a spool having a keyway therein, and said spindle means having an axial bore to receive a spindle shaft therein; and latching means mounted on said spindle means, said latching means being held in position latching said spindle means by said spindle shaft and moving to a position releasing said spindle means for separation of said reel sides upon withdrawal of said shaft, whereby either one of said spools is mountable on said spindle means.

2. A reel of the class described which includes: a first reel side; a second reel side; two-part spindle means connected to said reel sides for holding said reel sides in spaced parallel relationship, said spindle means being formed to seat a spool thereon and to receive a spindle shaft; and latching means mounted on said spindle means and operatively associated with said spindle shaft, said latching means being held by said shaft in a position locking said spindle parts together, and being movable to a position releasing said spindle parts upon withdrawal of said shaft.

3. A reel of the class described which includes: a first reel side; a second reel side; a first spindle member connected to said first reel side and projecting therefrom; a second spindle member connected to said second reel side and engageable with said first member to hold said reel sides in spaced parallel relationship, said members being formed to seat a spool having an internal key extending therefrom, and also to seat a spool having a keyway therein, and said members being axially bored to receive a spindle shaft therein; latching means mounted on one of said members and engageable with the other of said members to lock said members together, said latching means being held in a locking position by said spindle shaft and being movable to a position releasing said members upon withdrawal of said spindle shaft; and resilient means urging said latching means to said releasing position.

4. A reel of the class described which includes: a first reel side; a second reel side; a first spindle member connected to said first reel side and projecting therefrom, said spindle member having an internal chamber and an axial bore therethrough; a second spindle member connected to said second reel side and engageable with said first member to hold said reel sides in spaced parallel relationship, said second member having an internal chamber including a locking groove and an axial bore therethrough to align with said first member bore and receive a spindle shaft therein, and said members being formed externally to seat a spool thereon; latching means mounted in said first spindle chamber and movable from a position obstructing said axial bore to a position clear from said bore and engaging said locking groove to lock said members together; and annular resilient means urging said latching means to said obstructing position, said resilient means yielding upon the insertion of said spindle shaft to move said latching means to said groove locking position.

5. A reel of the class described which includes: a first reel side; a second reel side; a first cylindrical spindle member connected to said first reel side and projecting therefrom; a second cylindrical spindle member connected to said second reel side and engageable with said first spindle member to hold said reel sides in spaced parallel relationship, one of said members having an internal chamber and a radially extending slot opening therein, and said members being axially bored to receive a spindle shaft therein; a spool-engaging key slidably mounted in said slot and formed with internal lateral projections to limit the outward movement of said key upon contact with the wall of said member; a latch pivotally mounted within said chamber and movable in a plane through said spindle axis from an inner position obstructing said axial bore to an outer position engaging the other of said members and holding said members together; and resilient means for urging said key outwardly and said latch to said inner position, said resilient means yielding upon the insertion of the spindle shaft to move said latch to said outer position.

6. A reel of the class described which includes: a first circular reel side; a second circular reel side; a first cylindrical spindle member connected to said first reel side and projecting along the axis thereof, said member having an axial bore therethrough and an open end chamber at one end communicating with a radially extending slot; a second cylindrical spindle member connected to said second reel side and formed to align with said first member to hold said reel sides in spaced parallel relationship, said second member having an axial bore therethrough and an open-ended chamber provided with a locking groove and positioned to communicate with said first spindle chamber; a reduced hub projecting from one of said members and adapted to slidably engage the other of said members to hold said members in alignment; means connected with said members for locking engagement to prevent relative rotation therebetween; a spool-engaging key slidably mounted in said radial slot and formed with internal lateral projections to limit the outward movement of said key upon contact with the wall of said member; a pair of opposed latches pivotally mounted in said first spindle chamber and movable in a plane through said spindle axis from an inner position obstructing said axial bore to an outer position out of said bore, each of said latches having an outer arm to engage said locking groove in said second spindle member to hold said members together; and annular resilient means urging said key outwardly and said latches to said inner position, said resilient means yielding upon the insertion of a spindle shaft in said axial bore to move said latches to said outer position.

7. A reel of the class described which includes: a first circular reel side; a second circular reel side; a tubular spindle body connected to said first reel side and projecting forwardly on the axis thereof, said body having a forwardly opening chamber and a rear aperture adapted to receive a spindle shaft, the wall of said chamber having a radially extending slot therethrough; a disc-like spindle body connected to said second reel side and having a reduced skirt projecting rearwardly on the axis thereof to slidably engage said tubular spindle body and hold said reel sides spaced apart, said skirt having an internal lip defining an annular locking groove, and said disc-like spindle body having a forward aperture to receive said spindle shaft, said tubular body having an external keyway to receive a spool key therein; a pair of pivoted latch members mounted in said spindle chamber in opposed relationship, said members being rearwardly pivoted for movement in a plane through said spindle axis from an inner converging position to an outer position parallel to said axis, each of said members having a forward arm to engage in said locking groove to hold said bodies together upon movement to said outer position; a spool-engaging key slidably mounted in said radial slot and formed with internal lateral projections to limit the outward movement of said key upon contact with the wall of said body; and a resilient annulus surrounding said latch members forwardly of said pivoted ends and spaced below said key, whereby to urge said key outwardly and said latch members to said inner position.

8. A reel of the class described which includes: a first circular reel side; a second circular reel side; a first tubular spindle body connected to said first reel side and projecting forwardly on the axis thereof, said body having a forwardly opening chamber and a rear aperture adapted to receive a spindle shaft, the wall of said chamber having a radially extending slot therethrough; a second tubular body connected to said second reel side and projecting rearwardly on the axis thereof, said body having an internal lip defining an annular locking groove and a forward aperture to receive said spindle shaft, both of said bodies having external keyways aligned to receive a spool key therein; a reduced block mounted in said first body and projecting forwardly therefrom to slidably engage said second body and hold said reel sides spaced apart, said block having an axial bore therethrough; a spool-engaging key slidably mounted in said radial slot and formed with internal lateral projections to limit the outward movement of said key upon contact with the wall of said body; a resilient annulus spaced below said key within said first body chamber to urge said key outwardly; a pair of pivoted latch members mounted in said block in opposed relationship, said members being rearwardly pivoted for movement in a plane through said spindle axis from an inner converging position to an outer position parallel to said axis, each of said members having a forward arm to engage in said locking groove to hold said bodies together upon movement to said outer position; and a resilient annular member surrounding said latch members in said block forwardly of said pivoted ends to urge said members to said inner position.

ARTHUR BARSAM, Jr.

REFERENCES CITED

The following references are of record in the file of this patent:

UNITED STATES PATENTS

| Number | Name | Date |
| --- | --- | --- |
| 1,503,896 | Harris | Aug. 5, 1924 |
| 2,053,815 | De Panthou et al. | Sept. 8, 1936 |
| 2,116,735 | Stevens | May 10, 1938 |